United States Patent Office 3,035,062
Patented May 15, 1962

---

3,035,062
N,N'-DI(2,2,2-TRINITROETHYL) ETHYLENE UREA AND METHOD OF PRODUCTION
Howard A. Hageman, Englewood, N.J., assignor to United States Rubber Company, New York, N.Y., a corporation of New Jersey
No Drawing. Filed June 22, 1949, Ser. No. 100,752
2 Claims. (Cl. 260—309.7)

This invention relates to a new chemical compound, N,N'-di(2,2,2-trintiroethyl) ethylene urea, and to a method of making the same.

Although nitro-aliphatic compounds have been proposed for the formulation of explosives, their number and types have been restricted by the lack of a simple method for introducing a multiplicity of nitro groups into the compound and by the frequent instability of the products.

I have now unexpectedly discovered that two mols of trinitromethane can be readily condensed with one mol of N,N'-dimethylol ethylene urea to yield a new chemical which is useful as an explosive, N,N'-di(2,2,2-trinitroethyl) ethylene urea.

The equation for the reaction is as follows:

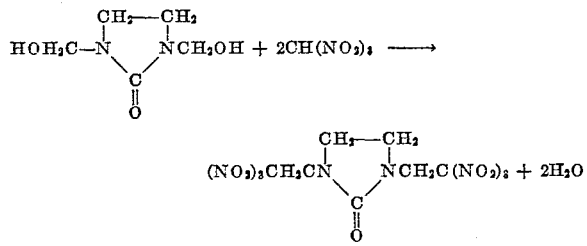

The reaction may conveniently be carried out by heating N,N'-dimethylol ethylene urea with two mols of trinitromethane, in the presence of a lower alkanol, such as methanol, as the reaction medium. The reaction may be effected at the boiling point of the mixture.

My invention may be illustrated in more detail by the following example.

Example

To 1.3 g. (0.01 mol) of dimethylol ethylene urea in 10 mls. of methanol there is added 3.0 g. (0.02 mol) of trinitromethane. The resultant solution is heated on the steam bath for 20 minutes. Most of the methanol evaporates leaving a yellow viscous residue which crystallizes upon scratching with a glass rod. The crude product is dissolved in about 90 ml. of boiling methanol; the solution is cooled and filtered to yield 2.7 g. (54% yield) of colorless needles, M.P. 177–178° C. of N,N'-di(2,2,2-trinitroethyl) ethylene urea.

|  | C | H | N |
|---|---|---|---|
| Calculated | 20.4 | 1.9 | 27.2 |
| Found | 20.5 | 1.9 | 27.2 |

Having thus described my invention, what I claim and desire to secure by Letters Patent is:

1. As a new chemical, N,N'-di(2,2,2-trinitroethyl) ethylene urea.
2. The method which comprises condensing trinitromethane with N,N'-dimethylol ethylene urea and thereby forming N,N'-di(2,2,2-trinitroethyl) ethylene urea.

No references cited.